US012643363B2

(12) United States Patent
Lund et al.

(10) Patent No.: US 12,643,363 B2
(45) Date of Patent: Jun. 2, 2026

(54) ADJUSTMENT ASSEMBLY FOR COMPENSATING A LENGTH VARIATION OF A SPRING ELEMENT AND WHEEL SUSPENSION ASSEMBLY FOR A VEHICLE

(71) Applicant: Volvo Car Corporation, Gothenburg (SE)

(72) Inventors: Oskar Lund, Gothenburg (SE); Erik Johansson, Gothenburg (SE); Mikael Sellergren, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 506 days.

(21) Appl. No.: 18/299,239

(22) Filed: Apr. 12, 2023

(65) Prior Publication Data

US 2023/0339281 A1 Oct. 26, 2023

(30) Foreign Application Priority Data

Apr. 26, 2022 (EP) ..................................... 22169955

(51) Int. Cl.
| | |
|---|---|
| *B60G 17/02* | (2006.01) |
| *B60G 11/16* | (2006.01) |
| *F16F 1/12* | (2006.01) |

(52) U.S. Cl.
CPC ............ *B60G 17/021* (2013.01); *B60G 11/16* (2013.01); *B60G 2204/124* (2013.01)

(58) Field of Classification Search
CPC .... F16F 1/121; F16F 7/116; F16F 2230/0041; F16F 9/44; F16F 9/32; B60G 17/00;
(Continued)

(56) References Cited

U.S. PATENT DOCUMENTS

| | | | | |
|---|---|---|---|---|
| 2,756,045 A | * | 7/1956 | Savory | ................... B62K 25/06 |
| | | | | 280/286 |
| 3,161,420 A | * | 12/1964 | Rix | ........................... F16F 1/44 |
| | | | | 280/124.13 |

(Continued)

FOREIGN PATENT DOCUMENTS

| | | | | |
|---|---|---|---|---|
| CN | | 108367649 A | 8/2018 | |
| CN | | 110696582 A | * 1/2020 | ............. B60G 17/06 |

(Continued)

OTHER PUBLICATIONS

Communication pursuant to Article 94(3) EPC received for EP Patent Application Serial No. 22169955.6 dated Apr. 6, 2023, 4 pages.

(Continued)

*Primary Examiner* — Robert A. Siconolfi
*Assistant Examiner* — James K Hsiao
(74) *Attorney, Agent, or Firm* — Amin, Turocy & Watson, LLP

(57) ABSTRACT

An adjustment assembly for compensating a length variation of a spring element for a vehicle is enabled. The adjustment assembly can comprise a first adjustment element having a primary abutment surface and a primary support surface. The adjustment assembly can comprise a second adjustment element having a secondary abutment surface and a secondary support surface. The first adjustment element and the second adjustment element can be arranged adjacent to one another along an axis such that the primary abutment surface and the secondary abutment surface contact each other. The primary abutment surface and the secondary abutment surface can extend circumferentially around the axis respectively and can be sloping, such that a distance between the primary support surface and the secondary support surface is (Continued)

adaptable by rotating the first adjustment element and the second adjustment element relative to one another.

20 Claims, 6 Drawing Sheets

(58) Field of Classification Search
CPC .................. B60G 17/021; B60G 11/16; B60G 2204/124; B60G 2202/12; B60G 2202/312; B60G 2204/61; B60G 2206/91; B60G 15/063; B60G 2204/4604
See application file for complete search history.

(56) References Cited

U.S. PATENT DOCUMENTS

| | | | | |
|---|---|---|---|---|
| 3,251,591 | A | * | 5/1966 | Mcnally ............... B60G 15/063 |
| | | | | 267/221 |
| 3,877,687 | A | * | 4/1975 | Sarti .................... B60G 17/021 |
| | | | | 267/195 |
| 4,079,922 | A | * | 3/1978 | Nicholls ............. B60G 17/021 |
| | | | | 267/218 |
| 4,261,423 | A | * | 4/1981 | Williamson ......... A01B 61/046 |
| | | | | 172/705 |
| 4,744,444 | A | * | 5/1988 | Gillingham ............... F16F 9/44 |
| | | | | 267/221 |
| 5,954,318 | A | * | 9/1999 | Kluhsman ............. B60G 11/16 |
| | | | | 267/221 |
| 7,896,321 | B2 | * | 3/2011 | Nakashima ........... F16F 13/007 |
| | | | | 267/221 |
| 8,573,573 | B2 | * | 11/2013 | Michel ................. B60G 15/068 |
| | | | | 267/225 |
| 10,166,831 | B2 | * | 1/2019 | Krehmer .............. B60G 17/021 |
| 2010/0308554 | A1 | * | 12/2010 | Kohlhauser ............. F16F 1/121 |
| | | | | 74/25 |
| 2011/0127747 | A1 | * | 6/2011 | Souschek ............. B60G 15/068 |
| | | | | 280/124.164 |
| 2016/0159191 | A1 | * | 6/2016 | Seminara ............. B60G 15/063 |
| | | | | 267/218 |
| 2017/0028805 | A1 | * | 2/2017 | Krehmer ................ B60G 15/07 |
| 2018/0178609 | A1 | * | 6/2018 | Fäth ......................... F16F 9/057 |
| 2019/0111750 | A1 | * | 4/2019 | Wolf-Monheim ........ F16F 1/22 |
| 2019/0152557 | A1 | * | 5/2019 | Seidl ...................... B62K 25/08 |
| 2021/0008947 | A1 | * | 1/2021 | Glas ...................... B60G 17/015 |
| 2021/0388882 | A1 | * | 12/2021 | Priewasser ............. B62K 25/04 |
| 2021/0403119 | A1 | * | 12/2021 | Yoshida .................. F16F 9/462 |
| 2022/0001714 | A1 | * | 1/2022 | Blankson ............. B60G 17/021 |
| 2022/0316545 | A1 | * | 10/2022 | Hiramaru .............. F16F 13/007 |

FOREIGN PATENT DOCUMENTS

| | | | | |
|---|---|---|---|---|
| CN | 111133220 | A | 5/2020 | |
| DE | 3743944 | A1 | 7/1989 | |
| DE | 102018211321 | A1 * | 1/2020 | ............. B60G 17/06 |
| DE | 10 2022 130 802 | B3 | 8/2023 | |
| EP | 3943775 | A1 | 1/2022 | |
| JP | S58146741 | A1 | 9/1983 | |
| JP | H04330433 | A | 11/1992 | |
| JP | S63177336 | U | 11/1998 | |
| KR | 10-2013-0041676 | A | 4/2013 | |
| WO | 2017/097655 | A1 | 6/2017 | |
| WO | 2019/064838 | A1 | 4/2019 | |

OTHER PUBLICATIONS

Communication under Rule 71(3) EPC received for EP Patent Application Serial No. 22169955.6 dated Dec. 15, 2023, 39 pages.
Extended EP Search Report for EP Application No. 22169955.6 dated Sep. 19, 2022, 20 pages.
First Office Action received for Chinese Patent Application Serial No. 202310459721.8 dated Dec. 27, 2025, 14 pages (Including English Translation).

* cited by examiner

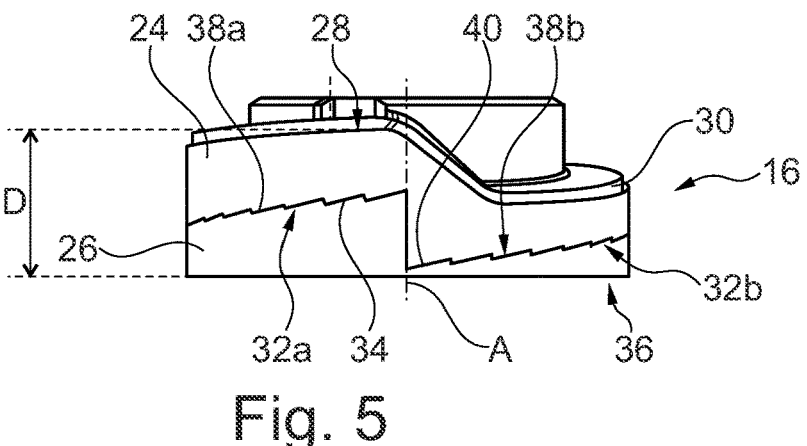
Fig. 5
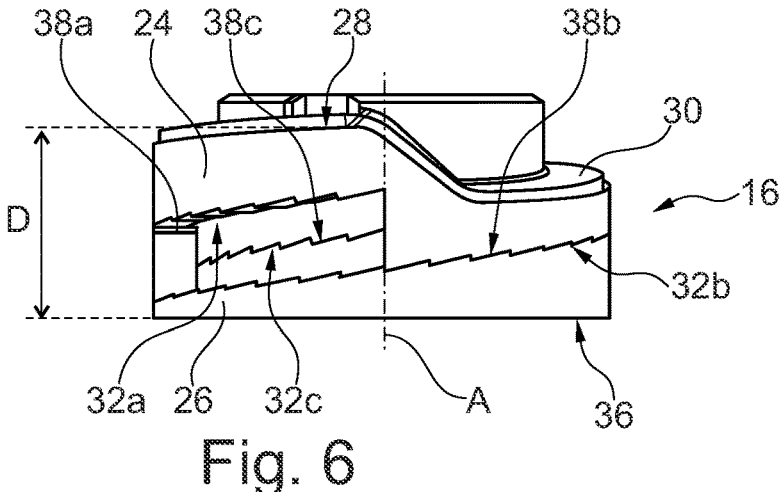
Fig. 6
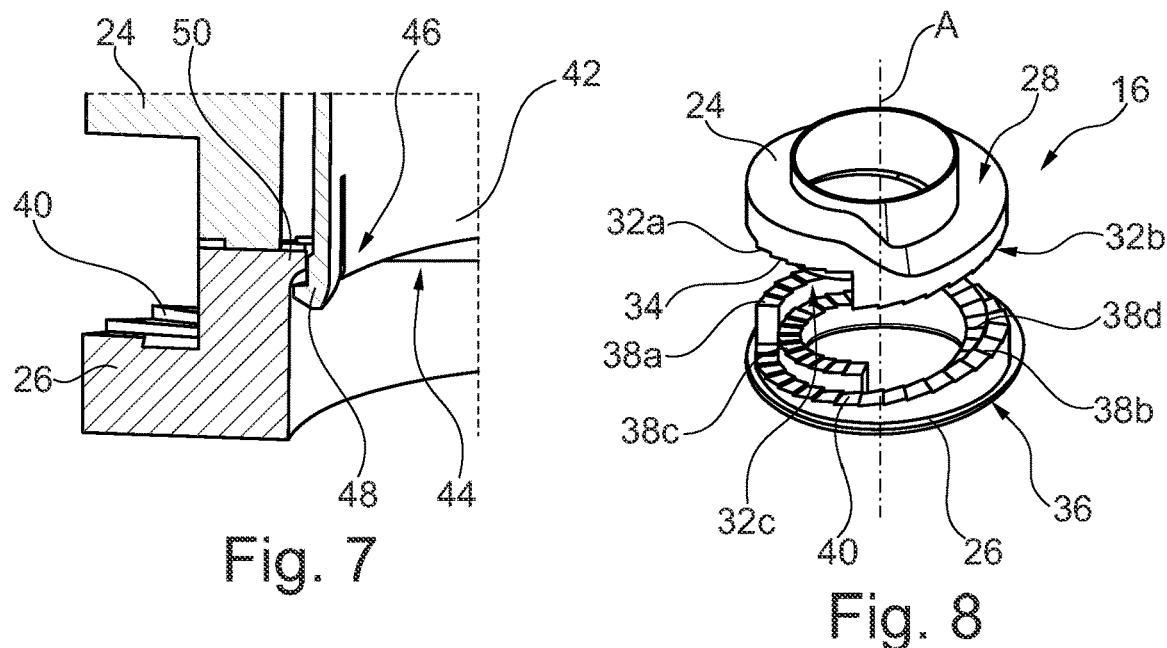
Fig. 7
Fig. 8

ADJUSTMENT ASSEMBLY FOR COMPENSATING A LENGTH VARIATION OF A SPRING ELEMENT AND WHEEL SUSPENSION ASSEMBLY FOR A VEHICLE

CROSS-REFERENCE TO RELATED APPLICATIONS

This application claims the benefit of and priority to pending EP Pat. application Ser. No. 22169955.6, filed Apr. 26, 2022 and entitled "ADJUSTMENT ASSEMBLY FOR COMPENSATING A LENGTH VARIATION OF A SPRING ELEMENT AND WHEEL SUSPENSION ASSEMBLY FOR A VEHICLE," the entirety of which is hereby incorporated by reference herein.

TECHNICAL FIELD

The present disclosure relates to an adjustment assembly for compensating a length variation of a spring element for a vehicle.

BACKGROUND

Lengths of spring elements for vehicles can vary, e.g. due to manufacturing tolerances. This means that spring elements having the same nominal lengths effectively have different lengths.

When being mounted in the vehicle, such length variations are undesired since the vehicle may be inclined to one side due to the installation of springs having different effective lengths.

The underlying problem comes back to a conflict of objectives. On the one hand, it is possible to produce spring elements respecting narrow tolerances and, thus, varying very little with respect to their effective length. However, such spring elements are cost-intensive.

On the other hand, the length variations may be compensated using an adjustment assembly being installed in the vehicle together with a spring element. However, such an adjustment assembly comprises additional parts. Moreover, the adjustment assembly needs to be produced in addition to the spring element. This also causes efforts and costs.

SUMMARY

It is an objective of the present disclosure to provide a way to eliminate or mitigate the negative effects resulting from varying lengths of spring elements. This way shall be cost-efficient, reliable and precise at the same time.

The problem is at least partially solved or alleviated by the subject matter of the independent claims of the present disclosure, wherein further examples are incorporated in the dependent claims.

According to a first aspect, there is provided an adjustment assembly for compensating a length variation of a spring element for a vehicle. The adjustment assembly comprises a first adjustment element, having a primary abutment surface and a primary support surface. The primary abutment surface and the primary support surface are arranged opposite each other. Moreover, the adjustment assembly comprises a second adjustment element having a secondary abutment surface and a secondary support surface. The secondary abutment surface and the secondary support surface are arranged opposite each other. The first adjustment element and the second adjustment element are arranged adjacent to one another along an axis such that the primary abutment surface and the secondary abutment surface contact each other. Furthermore, the primary abutment surface and the secondary abutment surface extend circumferentially around the axis respectively and are sloping such that a normal on each of the abutment surfaces has a component of extension along the axis and a component of extension along a corresponding circumferential direction. Additionally, the primary abutment surface and the secondary abutment surface are sloping such that a distance between the primary support surface and the secondary support surface is adaptable by rotating the first adjustment element and the second adjustment element relative to one another around the axis. Such an adjustment assembly is structurally very simple. At the same time, the distance between the primary support surface and the secondary support surface may be adjusted with ease and precision simply by rotating the first adjustment element and the second adjustment element relative to one another. It is noted that in the present context, the term primary is used to designate elements of the first adjustment element. Analogously, the term secondary is used to designate elements of the second adjustment element. However, neither the term primary nor the term secondary implies a number of elements. The support surfaces are configured for supporting a spring element or a structural part of a vehicle or a spring element adapter. The fact that the primary abutment surface and the secondary abutment surface contact each other means that at least a portion of the primary abutment surface contacts at least a portion of the secondary abutment surface. The term slope or sloping describes the fact that the respective abutment surfaces are inclined. This means that the abutment surfaces are neither parallel nor perpendicular with respect to the axis. The slope does not have a component of extension in the radial direction. Furthermore, the circumferential extension of the primary abutment surface and the secondary abutment surface covers a maximum of one turn. This further enhances the structural simplicity. Thus, the primary abutment surface and the secondary abutment surface do not at all form a thread or portions of a thread. Altogether the adjustment assembly is simple, reliable and precise at the same time. Consequently, an adjustment assembly according to the present disclosure may be used to simply, reliably and precisely compensate manufacturing tolerances of a spring element for a vehicle. In this context, a typical adjustment range is 0 mm to 8 mm.

According to an example, the primary abutment surface and the secondary abutment surface may be ring-shaped with the axis being a ring middle axis. In this context, the term ring-shaped covers both circumferentially closed geometries, i.e. closed ring-shaped geometries, and circumferentially incomplete ring shapes, i.e. circumferentially open ring-shaped geometries.

According to an example, on at least one of the primary abutment surface and the secondary abutment surface a plurality of protrusions is arranged. The protrusions may be formed as teeth or stairs. According to a variant, the protrusions are arranged on both the primary abutment surface and the secondary abutment surface. Thus, when rotating the first adjustment element and the second adjustment element relative to one another around the axis, the adjustment of the distance between the primary support surface and the secondary support surface may not be continuous, but incremental, one increment being associated with on tooth or one step. In this context, it has to be noted that the fact that both the primary abutment surface and the secondary abutment surface are sloping defines a global characteristic of the primary abutment surface and the secondary abutment surface, i.e. not every portion of the primary abutment surface and the secondary abutment surface has to be sloping. However, adjacent protrusions, e.g. steps or teeth, are always offset with respect to each other along the axis. The direction of offset is always the same when following the primary abutment surface and the secondary abutment surface along a corresponding circumferential direction. Using the protrusions, e.g. teeth or steps, certain relative rotatory positions of the first adjustment element and the second adjustment element may lock in place. Thus, it is comparatively easy to find the desired relative rotatory position of these parts in order to precisely compensate a length variation of an associated spring element. Even though the adjustment may be incremental, the increments may be chosen sufficiently small such that still a high precision of adjustment can be guaranteed.

In an example, on at least one of the primary abutment surface and the secondary abutment surface 5 to 30 protrusions are provided. Again, the protrusions may be formed as teeth or stairs. Thus, the number of protrusions can be adapted such that a targeted size of the adjustment increments is provided. The target increment may for example be 0.5 mm or 1 mm. This further facilitates the compensation of length variations of spring elements.

In an example, the protrusions form a positive locking being effective along the circumferential direction. Being effective along the circumferential direction means that a locking direction of the positive locking extends in parallel to the circumferential direction. As before, the protrusions may be formed as teeth or stairs. Alternative terms for a positive locking are form fit or positive fit. Thus, at a number of relative rotatory position of the first adjustment element and the second adjustment element, the primary abutment surface and the secondary abutment surface lock in place with respect to a circumferential direction. This means that the first adjustment element and the second adjustment element can only leave this relative rotatory position by overcoming a certain resistance. In this context, the positive locking may be effective in both circumferential directions. Alternatively, the positive locking may just be effective in the circumferential direction which is associated with approaching the primary support surface and the secondary support surface to one another. In both cases, each relative rotatory position of the first adjustment element and the second adjustment element can be reliably maintained. Thus, also a length compensation being provided by the adjustment assembly is reliably maintained.

In an example, one out of the first adjustment element and the second adjustment element comprises a positioning collar circumferentially extending around the axis. The respective other one out of the first adjustment element and the second adjustment element comprises an abutment wall circumferentially extending around the axis. The positioning collar contacts the abutment wall such that a relative movement between the first adjustment element and the second adjustment element in a direction perpendicular to the axis is blocked and a relative rotation is allowed. In other words, the positioning collar and the abutment wall form a rotatory guiding means allowing to rotate the first adjustment element and the second adjustment relative to each other in a defined manner. The combination of the positioning collar and the abutment wall can also be designated as a swivel guide. This further enhances the simplicity in operation and the precision of the length compensation that can be provided by the adjustment assembly.

In an example, the adjustment assembly comprises a securing means for securing the first adjustment element and the second adjustment element to one another along a direction parallel to the axis. Thus, the first adjustment element and the second adjustment element may either not be separated along a direction parallel to the axis or they may only be separated by overcoming a certain resistance. Both alternatives enhance the reliability of the adjustment assembly.

In a case in which the first adjustment element and the second adjustment element are ring-shaped, the securing means may be provided at an inner circumference of the ring shapes or at an outer circumference thereof.

In an example, at least a portion of the securing means may be arranged on the positioning collar. Thus, the positioning collar has a double-functionality, i.e. positioning and securing the first adjustment element and the second adjustment element relative to each other. This has the effect that the adjustment assembly can be designed in a compact manner.

In an example, the securing means forms a positive locking between the first adjustment element and the second adjustment element being effective along a direction parallel to the axis. Again, alternative terms for a positive locking are form fit or positive fit. Thus, the first adjustment element and the second adjustment element are secured on each other along a direction parallel to the axis. In other words, the first adjustment element and the second adjustment element are reliably held together.

In an example, the securing means may comprise a protruding hook and a rim, wherein the protruding hook is arranged on one out of the first adjustment element and the second adjustment element and the rim is arranged on the respective other one out of the first adjustment element and the second adjustment element. The protruding hook may also be designated a clip. This is a very simple and reliable form of a securing means.

In an example, the protruding hook is formed as a portion of the positioning collar.

In an example, an opening is provided at a center of at least one of the first adjustment element and the second adjustment element. The opening forms a reception space for a wheel suspension component. Thus, the adjustment assembly can be installed in a wheels suspension assembly in a space-saving manner.

The openings may be arranged coaxially with the axis.

In an example, the first adjustment element may comprise at least two primary abutment surfaces. The at least two primary abutment surfaces may be distributed along a common circumference around the axis. Alternatively or additionally, the second adjustment element may comprise at least two secondary abutment surfaces, wherein the at least two secondary abutment surfaces are distributed along a common circumference around the axis. Each of the two primary abutment surfaces and/or each of the two secondary abutment surfaces is sloping as has already been explained above for the abutment surfaces. The slope of each of the at least two primary abutment surfaces and/or the at least two secondary abutment surfaces is the same. The fact that now at least two primary abutment surfaces and/or at least two secondary abutment surfaces are provided has the effect, that the first adjustment element and the second adjustment element abut against each other in a very stable manner. Forces may be supported by at least two primary abutment surfaces and/or at least two secondary abutment surfaces. The at least two primary abutment surfaces and/or at least two secondary abutment surfaces may also provide a comparatively large total abutment surface between the first abutment element and the second abutment element. Consequently, the abutment assembly may be configured to support high forces and high loads.

In an example, the at least two primary abutment surfaces and/or the at least two secondary abutment surfaces are equally distributed over the circumference around the axis. In a case with two abutment surfaces, the abutment surfaces may be arranged diametrically opposite one another. Alternatively or additionally, the two abutment surfaces may be arranged circumferentially adjacent to one another in a circumferential direction. This means that each of the abutment surfaces covers half a turn or 180°. This, of course, applies to both the primary abutment surfaces and the secondary abutment surfaces. In a further alternative a circumferential gap may be provided between circumferentially adjacent abutment surfaces. Thus, in a case where two abutment surfaces are provided, each covers less than half a turn, i.e. less than 180°. As before, this applies to both the primary abutment surfaces and the secondary abutment surfaces. In all of the examples and variants mentioned above, the first adjustment element and the second adjustment element are supported on one another in a very stable manner.

In an example, the first adjustment element may comprise at least two primary abutment surfaces, wherein the at least two primary abutment surfaces circumferentially extend around the axis at different radii. Alternatively or additionally, the second adjustment element comprises at least two secondary abutment surfaces, wherein the at least two secondary abutment surfaces circumferentially extend around the axis at different radii. Again, each of the two primary abutment surfaces and/or each of the two secondary abutment surfaces is sloping as has already been explained above for the abutment surfaces. The slope of each of the at least two primary abutment surfaces and/or the at least two secondary abutment surfaces is the same. The fact that now at least two primary abutment surfaces and/or at least two secondary abutment surfaces are provided has the effect, that the first adjustment element and the second adjustment element abut against each other in a very stable manner. Forces may be supported by at least two primary abutment surfaces and/or at least two secondary abutment surfaces. The at least two primary abutment surfaces and/or at least two secondary abutment surfaces may also provide a comparatively large total abutment surface between the first abutment element and the second abutment element. Consequently, the abutment assembly may be configured to support high forces and high loads.

In an example, the first adjustment element may comprise two, three, four or five primary abutment surfaces. The two, three, four or five primary abutment surfaces may be distributed along a common circumference around the axis. Alternatively or additionally, the second adjustment element may comprise two, three, four or five secondary abutment surfaces, wherein the two, three, four or five secondary abutment surfaces are distributed along a common circumference around the axis.

In another example, the first adjustment element may comprise two, three, four or five primary abutment surfaces, wherein the two, three, four or five primary abutment surfaces circumferentially extend around the axis at different radii. Alternatively or additionally, the second adjustment element comprises two, three, four or five secondary abutment surfaces, wherein the two, three, four or five secondary abutment surfaces circumferentially extend around the axis at different radii.

It is noted that, of course, the above-mentioned examples according to which the at least two primary abutment surfaces and/or the at least two secondary abutment surfaces are distributed along a common circumference around the axis and according to which the at least two primary abutment surfaces and/or the at least two secondary abutment surfaces circumferentially extend around the axis at different radii may be combined. Thus, on each of the first adjustment element and the second adjustment element may comprise both at least two abutment surfaces being distributed along a common circumference and at least two abutment surfaces extending around the axis at different radii. This may lead to a particular stable support of the first adjustment element and the second adjustment element upon each other.

In an example, corresponding circumferential ends of the primary abutment surfaces and/or corresponding circumferential ends of the secondary abutment surfaces are regularly distributed over a circumference around the axis. This means that an angular distance between neighboring corresponding circumferential ends of the primary abutment surfaces and/or an angular distance between neighboring corresponding circumferential ends of the secondary abutment surfaces is constant. In this context, the circumferential ends of the primary abutment surfaces and the secondary abutment surfaces are defined as the respective start and end of the slope being formed by each of the abutment surfaces. Regularly distributing these ends leads to a mechanically stable support of the first adjustment element and the second adjustment element upon each other.

In an example, at least one of the first adjustment element and the second adjustment element may be a unitary piece. In other words, at least one of the first adjustment element and the second adjustment element is formed as an integral part. Thus, the first adjustment element and/or the second adjustment element may be produced in a simple and cost-efficient manner.

In an example, at least one of the first adjustment element and the second adjustment element may be made from plastic material. This also has the effect that the first adjustment element and/or the second adjustment element may be produced in a simple and cost-efficient manner. It is noted that the use of plastics material may be rendered possible by having primary and secondary abutment surfaces of sufficient size. Otherwise, the mechanical tensions which have to be supported by the first adjustment element and/or the second adjustment element may be too high.

In an example, the at least one of the first adjustment element and the second adjustment element being made from plastic material is produced by injection molding. This production technology is particularly suitable for mass production of adjustment assemblies.

According to an example, the plastics material may be a fiber-reinforced plastic material. Thus, the first adjustment element and/or the second adjustment element is reinforced by the fibers which enhances the respective mechanical properties. The adjustment assembly can thus be designed in a compact manner while still being able to support the necessary forces.

In an example, the reinforcement fibers are glass fibers.

According to a second aspect, there is provided a wheel suspension assembly for a vehicle. The wheel suspension assembly may comprise a spring element and an adjustment assembly according to the present disclosure, wherein the adjustment assembly is arranged at an end of the spring element. Thus, in a case in which the effective length of the spring element deviates from its nominal length in an undesired manner, this length deviation can be compensated using the adjustment assembly.

In an example, the spring element may be a coil spring. In another example, the spring element may be an air spring or a leaf spring. The compensation of length variations is possible for all of these examples.

It should be noted that the above examples may be combined with each other irrespective of the aspect involved.

These and other aspects of the present disclosure will become apparent from and elucidated with reference to the examples described hereinafter.

BRIEF DESCRIPTION OF THE DRAWINGS

Examples of the disclosure will be described in the following with reference to the following drawings.

FIG. 5 shows the adjustment assembly of FIGS. 2 to 4 in a lateral view, wherein the adjustment assembly is in a first, low configuration, FIG. 6 shows the adjustment assembly of FIGS. 2 to 5 in a lateral view, wherein the adjustment assembly is in a second, high configuration, FIG. 7 shows a detail of the adjustment assembly of FIG. 4 in a sectional view along VII-VII, FIG. 8 shows the adjustment assembly of FIGS. 2 to 6 in an exploded view.

DETAILED DESCRIPTION

The Figures are merely schematic representations and serve only to illustrate examples of the disclosure. Identical or equivalent elements are in principle provided with the same reference signs.

Figure 1:
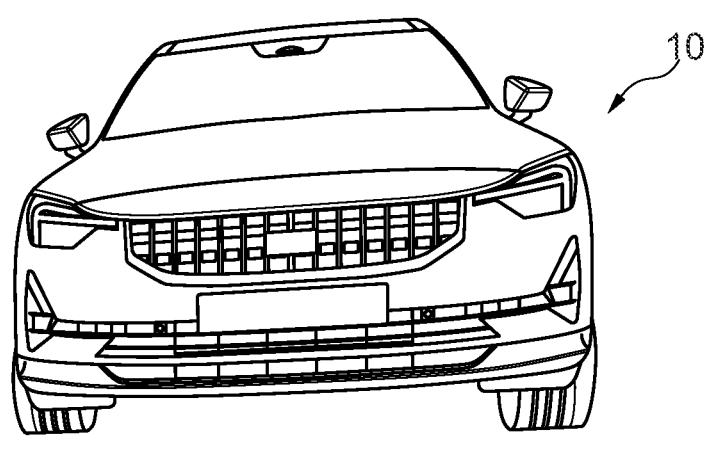
FIG. 1 shows a vehicle wherein spring elements of different effective length are used such that the vehicle is inclined.

FIG. 1 shows a vehicle 10 which is inclined to a right side with respect to a forward travelling direction. This is due to the fact that the vehicle uses wheel suspension assemblies comprising spring elements of different effective lengths.

Figure 2:
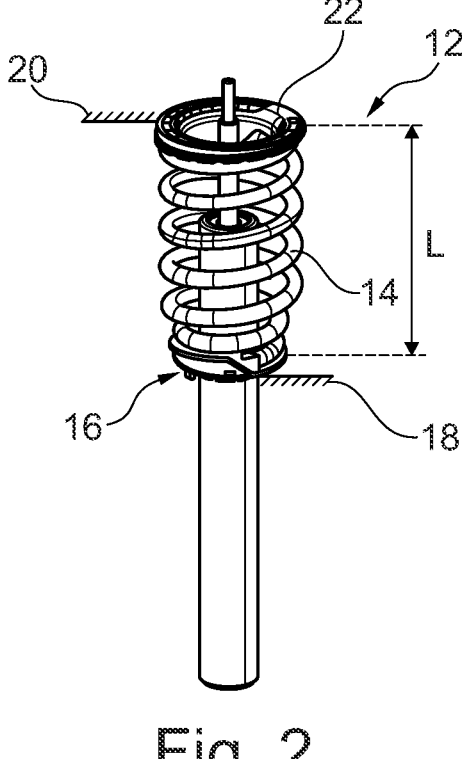
FIG. 2 shows a wheel suspension assembly according to the present disclosure having an adjustment assembly according to the present disclosure.
Figure 3:
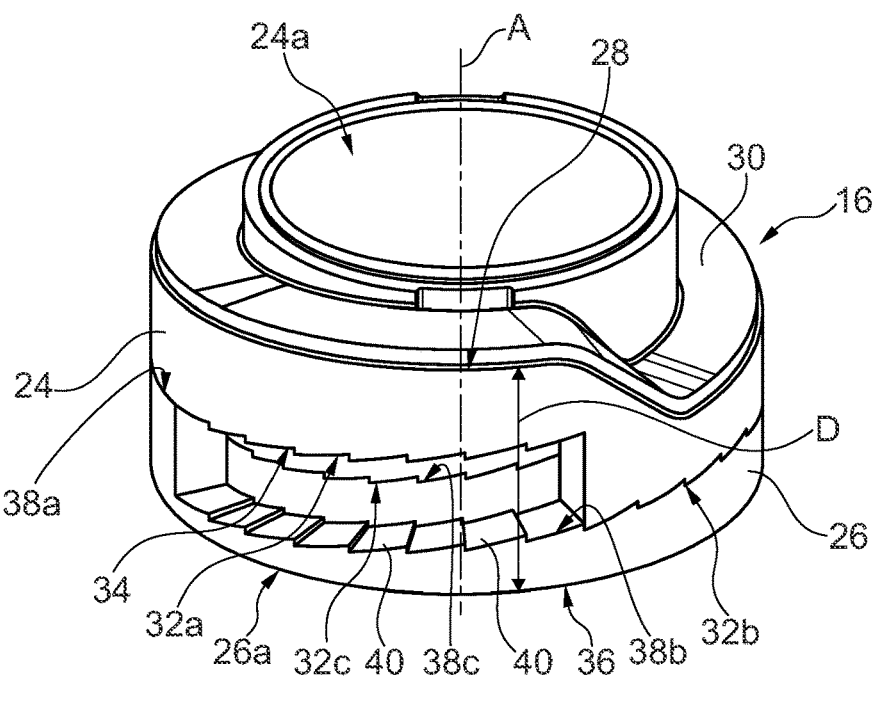
FIG. 3 shows the adjustment assembly of FIG. 2 in a more detailed view along a first perspective.

FIG. 2 shows a wheel suspension assembly 12 for a vehicle which is able to solve the problem of the vehicle 10 being inclined.

The wheel suspension assembly 12 comprises a spring element 14.

In the present example, the spring element 14 is a coil spring. In other examples, the spring element 14 may as well be an air spring or a leaf spring.

In the present example, the spring element 14 is subject to manufacturing tolerances. Consequently, an effective length L of the spring element 14 differs from a nominal length thereof.

In order to compensate this length difference, the wheel suspension assembly 12 comprises an adjustment assembly 16 being configured for compensating a length variation of the spring element 14.

In the present example, the adjustment assembly 16 is arranged at a lower end of the spring element 14. This means that the adjustment assembly 16 is interposed between the lower end of the spring element 14 and a first structural part 18 of the vehicle 10.

The upper end of the spring element 14 is supported on a second structural part 20 of the vehicle 10 via a non-adjustable abutment element 22.

The adjustment assembly 16 will be explained in further detail in connection with FIGS. 3 to 12.

The adjustment assembly 16 comprises a first adjustment element 24 being an upper adjustment element in the present example.

Moreover, the adjustment assembly 16 comprises a second adjustment element 26 being a lower adjustment element in the present example (cf. FIGS. 3, 4, 6, 7, and 8).

Both, the first adjustment element 24 and the second adjustment element 26 are ring shaped. Furthermore, the first adjustment element 24 and the second adjustment element 26 are arranged such that the respective ring shapes share a common axis A.

At a center of each of the first adjustment element 24 and the second adjustment element 26 an opening 24a, 26a is provided. The openings 24a, 26a form a reception space for a wheel suspension component respectively (see also FIG. 2).

Figure 9:
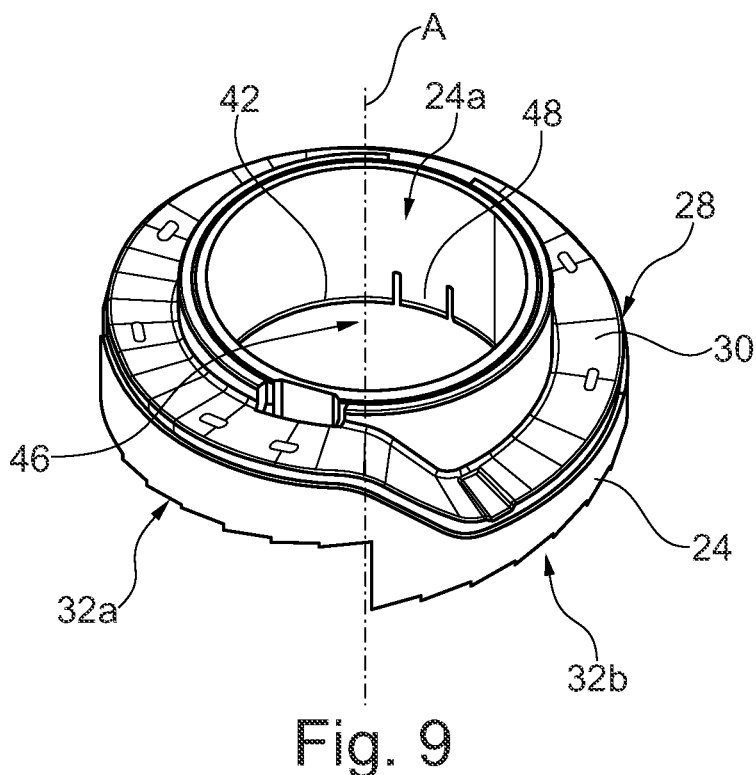
FIG. 9 shows a first adjustment element of the adjustment assembly of FIGS. 2 to 6 in a first perspective view.
Figure 10:
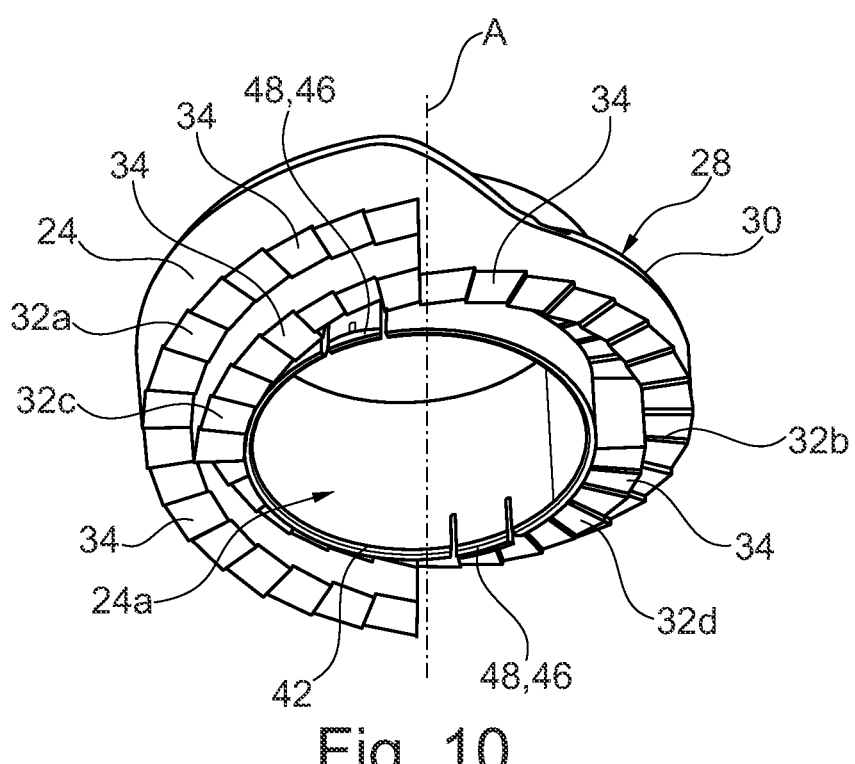
FIG. 10 shows the first adjustment element of FIG. 9 in a second perspective view.

The first adjustment element 24 comprises a primary support surface 28 being arranged on a first axial side of the first adjustment element 24 (cf. FIGS. 9 and 10).

The primary support surface 28 is configured to support an end of the spring element 14.

In the present example, a support pad 30 is arranged on the primary support surface 28.

Moreover, the first adjustment element 24 comprises a total of four primary abutment surfaces 32a, 32b, 32c, 32d (see especially FIG. 10).

All primary abutment surfaces 32a, 32b, 32c, 32d are arranged on an axial side of the primary adjustment element 14 being arranged opposite the primary support surface 28.

In the present example, all primary abutment surfaces 32a, 32b, 32c, 32d extend circumferentially around the axis A and the ends of the primary abutment surfaces 32a, 32b, 32c, 32d are regularly distributed over the circumference around the axis A.

In the present example, each of the primary abutment surfaces 32a, 32b, 32c, 32d extends over a circumference of 180°, wherein one of the primary abutment surfaces 32a, 32b, 32c, 32d starts every 90° of the circumference.

The primary abutment surfaces 32a and 32b are distributed along a common circumference around the axis A.

The same applies to the primary abutment surfaces 32c and 32d which are also distributed along a common circumference around the axis A.

However, the corresponding radii are different.

The primary abutment surfaces 32a and 32b extend along an outer, bigger radius wherein the primary abutment surfaces 32c and 32d extend along an inner, smaller radius.

In other words, the primary abutment surfaces 32a and 32b form an outer ring of abutment surfaces and the primary abutment surfaces 32c and 32d form an inner ring of abutment surfaces.

All primary abutment surfaces 32a, 32b, 32c, 32d are sloping, wherein a slope is identical for all primary abutment surfaces 32a, 32b, 32c, 32d.

Moreover, on each of the primary abutment surfaces 32a, 32b, 32c, 32d a number of protrusions is provided. In the present example, the protrusions are formed as teeth 34.

In the example shown in the Figures, each of the primary abutment surfaces 32a, 32b, 32c, 32d comprises 16 teeth 34. For a better visibility only some of the teeth 34 are provided with a reference sign.

Since the teeth 34 are comparatively flat with one tooth flank being substantially larger than the corresponding other tooth flank, the teeth may as well be designated as stairs.

Figure 11:
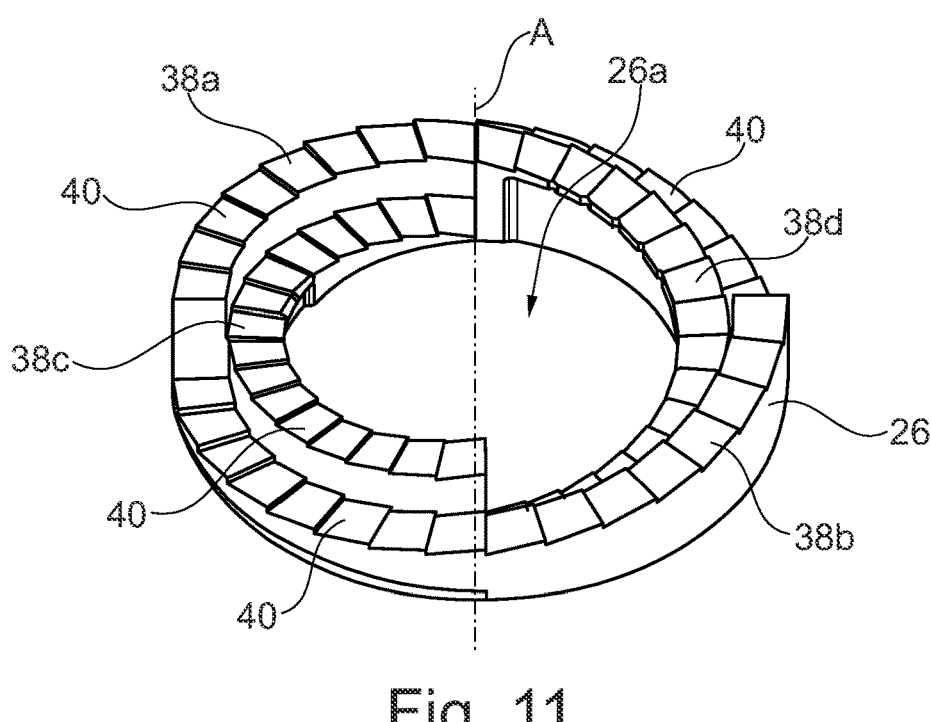
FIG. 11 shows a second adjustment element of the adjustment assembly of FIGS. 2 to 6 in a first perspective view.
Figure 12:
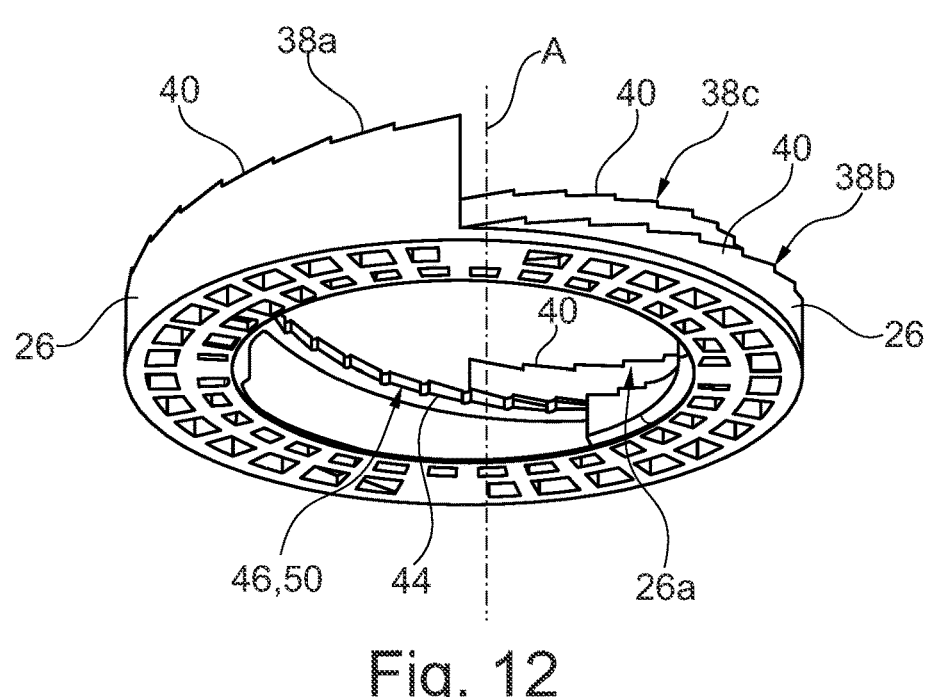
FIG. 12 shows the second adjustment element of FIG. 11 in a second perspective view.

The second adjustment element 26 comprises a secondary support surface 36 being arranged on a first axial side of the second adjustment element 26 (cf. FIGS. 11 and 12).

The secondary support surface 36 is configured to support the adjustment assembly 16 on the first structural part 18.

Moreover, the second adjustment element 26 comprises a total of four secondary abutment surfaces 38a, 38b, 38c, 38d (see especially FIG. 11).

All secondary abutment surfaces 38a, 38b, 38c, 38d are arranged on an axial side of the secondary adjustment element 26 being arranged opposite the secondary support surface 36.

In the present example, all secondary abutment surfaces 38a, 38b, 38c, 38d extend circumferentially around the axis A and the ends of the secondary abutment surfaces 38a, 38b, 38c, 38d are regularly distributed over the circumference around the axis A.

In the present example, each of the secondary abutment surfaces 38a, 38b, 38c, 38d extends over a circumference of 180°, wherein one of the secondary abutment surfaces 38a, 38b, 38c, 38d starts every 90° of the circumference.

The secondary abutment surfaces 38a and 38b are distributed along a common circumference around the axis A.

The same applies to the secondary abutment surfaces 38c and 38d which are also distributed along a common circumference around the axis A.

However, the corresponding radii are different.

The secondary abutment surfaces 38a and 38b extend along an outer, bigger radius wherein the secondary abutment surfaces 38c and 38d extend along an inner, smaller radius.

In other words, the secondary abutment surfaces 38a and 38b form an outer ring of abutment surfaces and the secondary abutment surfaces 38c and 38d form an inner ring of abutment surfaces.

All secondary abutment surfaces 38a, 38b, 38c, 38d are sloping, wherein a slope is identical for all secondary abutment surfaces 38a, 38b, 38c, 38d.

Moreover, the slope of the secondary abutment surfaces 38a, 38b, 38c, 38d is identical to the slope of the primary abutment surfaces 32a, 32b, 32c, 32d.

Furthermore, on each of the secondary abutment surfaces 38a, 38b, 38c, 38d a number of protrusions is provided. In the present example, the protrusions are formed as teeth 40.

In the example shown in the Figures, each of the secondary abutment surfaces 38a, 38b, 38c, 38d comprises 16 teeth 40. For a better visibility only some of the teeth 40 are provided with a reference sign.

Since the teeth 40 are comparatively flat with one tooth flank being substantially larger than the corresponding other tooth flank, the teeth may as well be designated as stairs.

The first adjustment element 24 and the second adjustment element 26 are arranged adjacent to one another along the axis A such that the primary abutment surfaces 32a, 32b, 32c, 32d and the secondary abutment surfaces 38a, 38b, 38c, 38d contact each other pairwise.

In more detail, primary abutment surface 32a contacts secondary abutment surface 38a, primary abutment surface 32b contacts secondary abutment surface 38b, primary abutment surface 32c contacts secondary abutment surface 38c, and primary abutment surface 32d contacts secondary abutment surface 38d.

The slopes of the primary abutment surfaces 32a, 32b, 32c, 32d and the secondary abutment surfaces 38a, 38b, 38c, 38d are formed such that a normal on each of the abutment surfaces 32a, 32b, 32c, 32d and 38a, 38b, 38c, 38d has a component of extension along the axis A and a component of extension along the corresponding circumferential direction.

Consequently, a distance D between the primary support surface 28 and the secondary support surface 36 is adaptable by rotating the first adjustment element 24 and the second adjustment element 26 relative to one another around the axis A.

This may best be seen by comparing FIGS. 5 and 6.

FIG. 5 shows the adjustment assembly 16 in a first configuration. In this configuration, each of the primary abutment surfaces 32a, 32b, 32c, 32d contacts the corresponding secondary abutment surfaces 38a, 38b, 38c, 38d over its full extent respectively.

This means that the primary abutment surface 32a and the secondary abutment surface 38a contact each other over 180°, the primary abutment surface 32b and the secondary abutment surface 38b contact each other over 180°, the primary abutment surface 32c and the secondary abutment surface 38c contact each other over 180°, and the primary abutment surface 32d and the secondary abutment surface 38d contact each other over 180°.

Consequently, the distance D between the primary support surface 28 and the secondary support surface 36 is as small as it can be. Therefore, the configuration of FIG. 5 may also be called the low configuration of the adjustment assembly 16.

FIG. 6 shows the adjustment assembly 16 in a second configuration. In this configuration, each of the pairs of primary abutment surfaces 32a, 32b, 32c, 32d and secondary abutment surfaces 38a, 38b, 38c, 38d are in contact only over less than the respective full extent.

In the example shown in the Figures, the primary abutment surface 32a and the secondary abutment surface 38a contact each other over 90°, the primary abutment surface 32b and the secondary abutment surface 38b contact each other over 90°, the primary abutment surface 32c and the secondary abutment surface 38c contact each other over 90°, and the primary abutment surface 32d and the secondary abutment surface 38d contact each other over 90°.

Consequently, the distance D between the primary support surface 28 and the secondary support surface 36 is higher than in the first configuration of FIG. 5 due to the fact that all primary abutment surfaces 32a, 32b, 32c, 32d and all secondary abutment surfaces 38a, 38b, 38c, 38d are sloping. Therefore, the configuration of FIG. 6 may also be called the high configuration of the adjustment assembly 16.

The adjustment assembly 16 may be transferred from the first configuration (cf. FIG. 5) into the second configuration (cf. FIG. 6) by rotating the first adjustment element 24 with respect to the second adjustment element 26 around axis A. The same is true for transferring the adjustment assembly 16 from the second configuration (cf. FIG. 6) into the first configuration (cf. FIG. 5).

Of course, also intermediate rotatory relative positions between the first adjustment element 24 and the second adjustment element 26 are possible such that the distance D between the primary support surface 28 and the secondary support 36 lies between the distances D shown in FIGS. 5 and 6.

In each of the relative rotatory positions of the first adjustment element 24 and the second adjustment element 26, the teeth 34, 40 form a positive locking being effective along the circumferential direction. In more detail, the positive locking is effective along both circumferential directions.

If again considering FIGS. 5 and 6, a relative rotation of the first adjustment element 24 with respect to the second adjustment element 26 is only possible if one allows the first adjustment element 24 and the second adjustment element to have a relative movement along axis A.

Thus, if the adjustment assembly 16 is installed in the vehicle 10 with the first adjustment element 24 and the second adjustment element 26 being in a certain rotatory relative position and with the vehicle 10 and/or the spring element 14 exerting a certain compressive force on the adjustment assembly 16 along the axis A, the first adjustment element 24 and the second adjustment element 26 cannot rotate relative to each other due to the teeth 34, 40 engaging each other.

Figure 4:
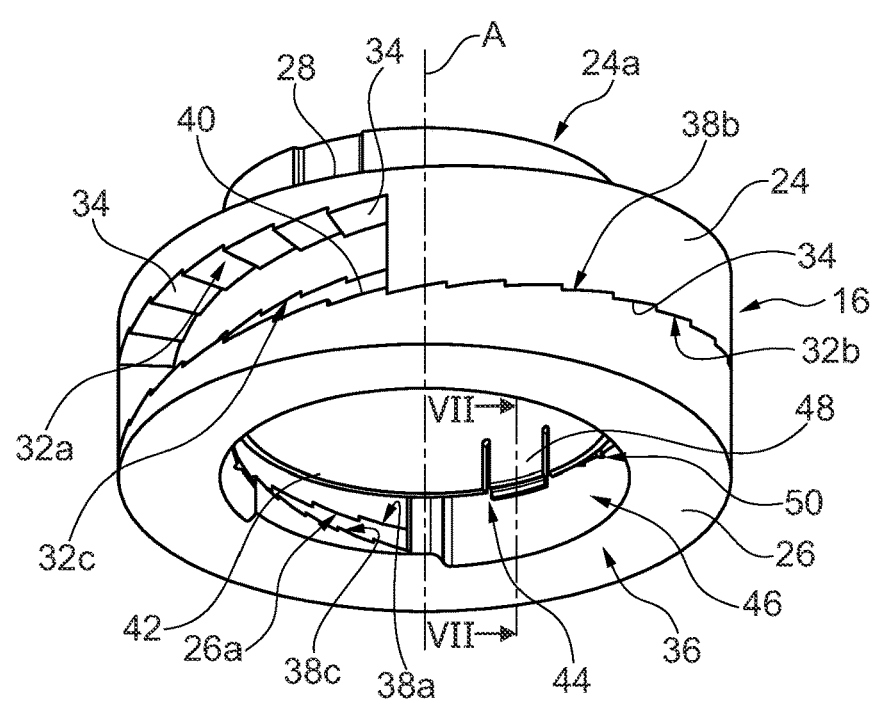
FIG. 4 shows the adjustment assembly of FIG. 2 in a more detailed view along a second perspective.

In order to facilitate relative rotation of the first adjustment element 24 with respect to the second adjustment element 26, a positioning collar 42 is provided at an inner circumference of the first adjustment element 24 (cf. FIGS. 4, 7 and 10).

The positioning collar 42 extends circumferentially around the axis A and protrudes from the first adjustment element 24 towards the second adjustment element 26.

On the second adjustment element 26, a corresponding abutment wall 44 is provided at its inner circumference. Also the abutment wall 44 circumferentially extends around the axis A.

The positioning collar 42 at least partially contacts the abutment wall 44 such that a relative movement between the first adjustment element 24 and the second adjustment element 26 in a direction perpendicular to the axis A is blocked and a relative rotation is allowed. In other words, the positioning collar 42 and the abutment wall 44 form a rotational guiding means.

The adjustment assembly 16 further comprises a securing means 46 for securing the first adjustment element 24 and the second adjustment element 26 to one another along a direction parallel to the axis A (cf. FIGS. 4, 7 and 10).

In the present example, the securing means 46 comprises two securing hooks 48 which are formed as portions of the positioning collar 42.

The securing hooks 48 are arranged at opposite positions of the positioning collar 42.

Moreover, the securing means 46 comprises a securing rim 50.

In the present example, the securing rim 50 is arranged at an inner circumference of the opening 26a and protrudes towards an interior of the opening 26a.

When the adjustment assembly 16 is mounted, the two securing hooks 48 engage the securing rim 50 such that a positive locking between the first adjustment element 24 and the second adjustment element 26 is formed. This positive locking is effective along a direction parallel to the axis A. This means that the first adjusting element 14 and the second adjusting element 26 can only be separated by a relative movement along the axis A if a resistance provided by the securing means 46 is overcome.

In the present example, both the first adjustment element 24 and the second adjustment element 26 are made as a unitary piece respectively. Both the first adjustment element 24 and the second adjustment element 26 are made from glass fiber reinforced plastic material.

Figures 13, 14:
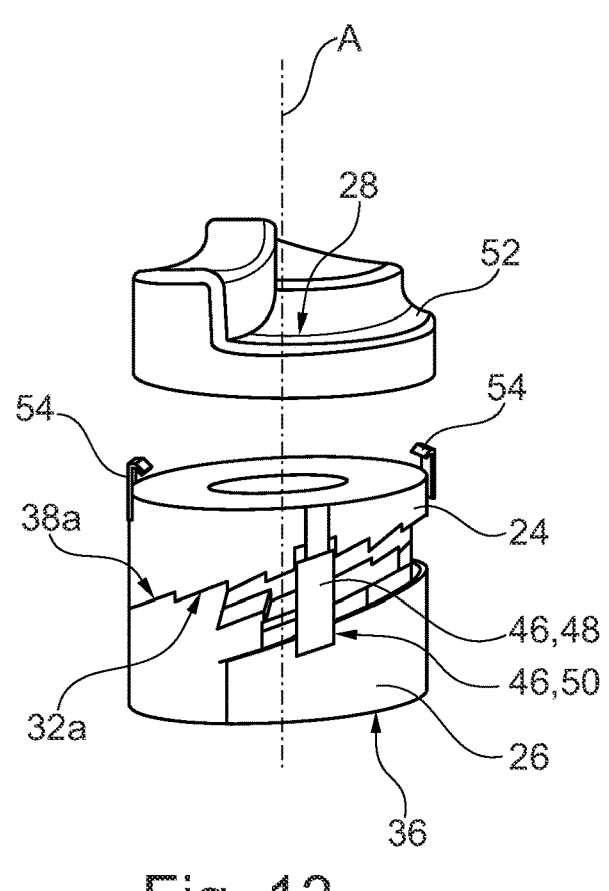
FIG. 13 shows another example of an adjustment assembly according to the present disclosure in a partially exploded view.
FIG. 14 shows a further example of an adjustment assembly according to the present disclosure in an exploded view.

FIG. 13 shows another example of an adjustment assembly 16.

In the following, only the differences between the example of FIG. 13 and the adjustment assembly of FIGS. 3 to 12 will be explained. For the remaining aspects, reference is made to the above explanations. The same reference signs are used for identical or corresponding parts.

It is understood that the adjustment assembly 16 of FIG. 13 can be used as an alternative to the adjustment assembly 16 of FIGS. 3 to 12 in the wheel suspension assembly 12 of FIG. 2.

A first difference relates to the securing means 46.

In the example of FIG. 13, the securing hooks 48 are arranged at an outer circumference of the first adjustment element 24. Accordingly, the securing rim 50 is also provided at an outer circumference of the second adjustment element 26.

A second difference relates to the design of the first adjustment element 24 and more particularly to the primary support surface 28. In the example of FIG. 13, the primary support surface 28 is provided on a separate adapter piece 52 which is mounted on the first adjustment element using two mounting hooks 54.

Thus, the adjustment assembly 16 is made of three parts in total, i.e. the adapter piece 52, the first adjustment element 24 and the second adjustment element 26.

A further example of the adjustment assembly 16 is shown in FIG. 14.

Again, only the differences between the example of FIG. 14 and the adjustment assembly of FIGS. 3 to 12 will be explained. For the remaining aspects, reference is made to the above explanations. The same reference signs are used for identical or corresponding parts.

It is understood that the adjustment assembly 16 of FIG. 14 can be used as an alternative to the adjustment assembly 16 of FIGS. 3 to 12 in the wheel suspension assembly 12 of FIG. 2.

The first adjustment element 24 and the second adjustment element 26 of the adjustment assembly 16 according to FIG. 14 only comprise two primary abutment surfaces 32a, 32b and two secondary abutment surfaces 38a, 38b respectively.

As compared to the adjustment assembly 16 of FIGS. 3 to 12, the primary abutment surfaces and the secondary abutment surfaces on the inner circumference are omitted.

Moreover, in the example of FIG. 14, the positioning collar 42 is provided on the second adjustment element 26 instead of being provided on the first adjustment element 24.

Also the securing means 46 is different.

In the example of FIG. 14, the securing means 46 comprises a set of protrusions 56 being arranged in accordance with a regular pattern on the outer circumference of the positioning collar 42. On an adjacent portion of the abutment wall 44, corresponding depressions 58 are provided in accordance with a corresponding regular pattern. The protrusions 56 are configured for extending into the depressions 58 such that a positive locking is generated between the first adjustment element 24 and the second adjustment element 26 being effective along the axis A.

It is understood, that it is also possible to invert the securing means 46 such that the protrusions 56 are provided on the abutment wall 44 and the depressions 58 are arranged on the positioning collar 42.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

LIST OF REFERENCE SIGNS 10 vehicle
12 wheel suspension assembly
14 spring element
16 adjustment assembly
18 first structural part
20 second structural part
22 non-adjustable abutment element
24 first adjustment element
24a opening
26 second adjustment element
26a opening
28 primary support surface
30 support pad
32a primary abutment surface
32b primary abutment surface
32c primary abutment surface
32d primary abutment surface
34 tooth
36 secondary support surface
38a secondary abutment surface
38b secondary abutment surface
38c secondary abutment surface
38d secondary abutment surface
40 tooth
42 positioning collar
44 abutment wall
46 securing means
48 securing hook
50 securing rim
52 adapter piece
54 mounting hook
56 protrusion
58 depression
A axis
D distance between primary support surface and secondary support surface
L effective length of the spring element

What is claimed is:

1. An adjustment assembly for compensating a length variation of a spring element for a vehicle, the adjustment assembly comprising:
   a first adjustment element comprising a primary abutment surface and a primary support surface, wherein the primary abutment surface and the primary support surface are arranged opposite each other; and a second adjustment element comprising a secondary abutment surface and a secondary support surface, wherein the secondary abutment surface and the secondary support surface are arranged opposite each other,
   wherein the first adjustment element and the second adjustment element are arranged adjacent to one another along an axis such that the primary abutment surface and the secondary abutment surface contact each other,
   wherein the primary abutment surface and the secondary abutment surface extend circumferentially around the axis respectively and are sloping such that a normal on each of the primary abutment surface and the secondary abutment surface has a component of extension along the axis and a component of extension along a corresponding circumferential direction and such that a distance between the primary support surface and the secondary support surface is adaptable by rotating the first adjustment element and the second adjustment element relative to one another around the axis, and
   wherein one out of the first adjustment element and the second adjustment element comprises a positioning collar circumferentially extending around the axis and the respective other one out of the first adjustment element and the second adjustment element comprises an abutment wall circumferentially extending around the axis, wherein the positioning collar contacts the abutment wall such that a relative movement between the first adjustment element and the second adjustment element in a direction perpendicular to the axis is blocked and a relative rotation is allowed.

2. The adjustment assembly of claim 1, wherein, on at least one of the primary abutment surface and the secondary abutment surface, a plurality of protrusions is arranged.

3. The adjustment assembly of claim 2, wherein, on at least one of the primary abutment surface and the secondary abutment surface, 5 to 30 protrusions are provided.

4. The adjustment assembly of claim 2, wherein the plurality of protrusions form a positive locking being effective along the corresponding circumferential direction.

5. The adjustment assembly of claim 1, further comprising:
   a securing means for securing the first adjustment element and the second adjustment element to one another along a direction parallel to the axis.

6. The adjustment assembly of claim 5, wherein at least a portion of the securing means is arranged on the positioning collar.

7. The adjustment assembly of claim 5, wherein the securing means forms a positive locking between the first adjustment element and the second adjustment element being effective along the direction parallel to the axis.

8. The adjustment assembly of claim 1, wherein, at a center of at least one of the first adjustment element and the second adjustment element, an opening is provided, the opening forming a reception space for a wheel suspension component.

9. The adjustment assembly of claim 1, wherein
   the first adjustment element comprises at least two primary abutment surfaces, wherein the at least two primary abutment surfaces are distributed along a first common circumference around the axis, or
   the second adjustment element comprises at least two secondary abutment surfaces, wherein the at least two secondary abutment surfaces are distributed along a second common circumference around the axis.

10. The adjustment assembly of claim 9, wherein corresponding circumferential ends of the primary abutment surfaces or corresponding circumferential ends of the secondary abutment surfaces are regularly distributed over a circumference around the axis.

11. The adjustment assembly of claim 1, wherein the first adjustment element comprises at least two primary abutment surfaces, wherein the at least two primary abutment surfaces circumferentially extend around the axis at different radii, or the second adjustment element comprises at least two secondary abutment surfaces, wherein the at least two secondary abutment surfaces circumferentially extend around the axis at different radii.

12. The adjustment assembly of claim 11, wherein corresponding circumferential ends of the primary abutment surfaces or corresponding circumferential ends of the secondary abutment surfaces are regularly distributed over a circumference around the axis.

13. The adjustment assembly of claim 1, wherein at least one of the first adjustment element and the second adjustment element is a unitary piece.

14. The adjustment assembly of claim 1, wherein at least one of the first adjustment element and the second adjustment element is made from plastic material.

15. A wheel suspension assembly for a vehicle, the wheel suspension assembly comprising:

a spring element; and an adjustment assembly, the adjustment assembly comprising:

a first adjustment element, having a primary abutment surface and a primary support surface, wherein the primary abutment surface and the primary support surface are arranged opposite each other, and a second adjustment element having a secondary abutment surface and a secondary support surface, wherein the secondary abutment surface and the secondary support surface are arranged opposite each other, wherein the first adjustment element and the second adjustment element are arranged adjacent to one another along an axis such that the primary abutment surface and the secondary abutment surface contact each other, wherein the primary abutment surface and the secondary abutment surface extend circumferentially around the axis respectively and are sloping such that a normal on each of the primary abutment surface and the secondary abutment surface has a component of extension along the axis and a component of extension along a corresponding circumferential direction and such that a distance between the primary support surface and the secondary support surface is adaptable by rotating the first adjustment element and the second adjustment element relative to one another around the axis, wherein one out of the first adjustment element and the second adjustment element comprises a positioning collar circumferentially extending around the axis and the respective other one out of the first adjustment element and the second adjustment element comprises an abutment wall circumferentially extending around the axis, wherein the positioning collar contacts the abutment wall such that a relative movement between the first adjustment element and the second adjustment element in a direction perpendicular to the axis is blocked and a relative rotation is allowed, and wherein the adjustment assembly is arranged at an end of the spring element.

16. The wheel suspension assembly of claim 15, wherein, on at least one of the primary abutment surface and the secondary abutment surface, a plurality of protrusions is arranged.

17. The wheel suspension assembly of claim 16, wherein, on at least one of the primary abutment surface and the secondary abutment surface, 5 to 30 protrusions are provided.

18. The wheel suspension assembly of claim 16, wherein the plurality of protrusions form a positive locking being effective along the corresponding circumferential direction.

19. A vehicle, comprising:

a spring element;

a first adjustment element, having a primary abutment surface and a primary support surface, wherein the primary abutment surface and the primary support surface are arranged opposite each other; and a second adjustment element having a secondary abutment surface and a secondary support surface, wherein the secondary abutment surface and the secondary support surface are arranged opposite each other, wherein the first adjustment element and the second adjustment element are arranged adjacent to one another along an axis such that the primary abutment surface and the secondary abutment surface contact each other, and wherein the primary abutment surface and the secondary abutment surface extend circumferentially around the axis respectively and are sloping such that a normal on each of the primary abutment surface and the secondary abutment surface has a component of extension along the axis and a component of extension along a corresponding circumferential direction and such that a distance between the primary support surface and the secondary support surface is adaptable by rotating the first adjustment element and the second adjustment element relative to one another around the axis, and wherein one out of the first adjustment element and the second adjustment element comprises a positioning collar circumferentially extending around the axis and the respective other one out of the first adjustment element and the second adjustment element comprises an abutment wall circumferentially extending around the axis, wherein the positioning collar contacts the abutment wall such that a relative movement between the first adjustment element and the second adjustment element in a direction perpendicular to the axis is blocked and a relative rotation is allowed.

20. The vehicle of claim 19, further comprising:

a securing means for securing the first adjustment element and the second adjustment element to one another along a direction parallel to the axis.

* * * * *